(12) United States Patent
Pi et al.

(10) Patent No.: US 10,244,579 B2
(45) Date of Patent: Mar. 26, 2019

(54) TECHNIQUES FOR MILLIMETER WAVE MOBILE COMMUNICATION

(75) Inventors: Zhouyue Pi, Allen, TX (US); Farooq Khan, Allen, TX (US); Jianzhong Zhang, Irving, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1012 days.

(21) Appl. No.: 12/916,019

(22) Filed: Oct. 29, 2010

(65) Prior Publication Data

US 2011/0182174 A1    Jul. 28, 2011

Related U.S. Application Data

(60) Provisional application No. 61/299,304, filed on Jan. 28, 2010.

(51) Int. Cl.
*H04B 7/005* (2006.01)
*H04W 28/02* (2009.01)
*H04W 88/10* (2009.01)

(52) U.S. Cl.
CPC .................. *H04W 88/10* (2013.01)

(58) Field of Classification Search
USPC ........................................ 370/229, 259, 278
See application file for complete search history.

(56) References Cited

U.S. PATENT DOCUMENTS

| 5,794,159 | A   | * | 8/1998  | Portin ........................ 455/553.1 |
|-----------|-----|---|---------|------------------------------------------|
| 7,062,293 | B2  | * | 6/2006  | Johnson et al. ............. 455/561      |
| 8,090,379 | B2  | * | 1/2012  | Lambert et al. ............. 455/446      |
| 2006/0111047 | A1 | * | 5/2006  | Louberg et al. ............. 455/41.2    |
| 2006/0141929 | A1 |   | 6/2006  | Lockie et al.                            |
| 2007/0225015 | A1 | * | 9/2007  | Mueckenheim .... H04L 12/5693            |
|           |     |   |         | 455/453                                  |
| 2011/0053521 | A1 | * | 3/2011  | Cordeiro ........................ 455/73 |
| 2011/0075642 | A1 | * | 3/2011  | Cordeiro ........... H04W 74/0816         |
|           |     |   |         | 370/338                                  |
| 2011/0141968 | A1 | * | 6/2011  | Trainin ........................ 370/328 |
| 2011/0319092 | A1 | * | 12/2011 | Kim ....................... H04B 7/024    |
|           |     |   |         | 455/452.1                                |
| 2012/0250672 | A1 | * | 10/2012 | Cordeiro et al. ............. 370/346    |

OTHER PUBLICATIONS

Millimeter-Wave Wireless Communications Systems: Theory and Applications; EURASIP Journal on Wireless Communications and Networking; vol. 2007; 2007.

* cited by examiner

*Primary Examiner* — Yemane Mesfin
*Assistant Examiner* — Henry Baron (57) ABSTRACT

A Base Station (BS), a Mobile Station (MS), and a millimeter Wave (mmWave) Access Point (mmAP), for use in a mobile communication system that includes a plurality of Base Stations BSs capable of communicating with a plurality of Mobile Stations (MSs), are provided. The BS includes a cellular band transceiver for communicating in a cellular band, an mmWave band transceiver for communicating in the mmWave band, and a controller for controlling both the cellular band transceiver and the mmWave band transceiver for communication with an MS.

5 Claims, 6 Drawing Sheets

TECHNIQUES FOR MILLIMETER WAVE MOBILE COMMUNICATION

CROSS-REFERENCE TO RELATED APPLICATION

This application claims the benefit under 35 U.S.C. § 119(e) of a U.S. Provisional application filed on Jan. 28, 2010 in the U.S. Patent and Trademark Office and assigned Ser. No. 61/299,304, the entire disclosure of which is hereby incorporated by reference.

BACKGROUND OF THE INVENTION

1. Field of the Invention

Aspects of the present invention relate to techniques for a mobile communication. More particularly, aspects of the present invention relate to techniques for millimeter Wave (mmWave) mobile communication.

2. Description of the Related Art

Mobile communication has been one of the most successful innovations in the $20^{th}$ century. In recent years, the number of subscribers to mobile communication services has exceeded 4.5 billion and is growing fast. At the same time, new mobile communication technologies have been developed to satisfy the increasing need for, and to provide more and better, mobile communication applications and services. Some examples of such systems are Code Division Multiple Access 2000 (CDMA2000) 1× EVolution-Data Optimized (EV-DO) systems developed by $3^{rd}$ Generation Partnership Project 2 (3GPP2), Wideband Code Division Multiple Access (WCDMA), High Speed Packet Access (HSPA), and Long Term Evolution (LTE) systems developed by $3^{rd}$ Generation Partnership Project (3GPP), and mobile Worldwide Interoperability for Microwave Access (WiMAX) systems developed by Institute of Electrical and Electronics Engineers (IEEE). As more and more people become users of mobile communication systems, and more and more services are provided over these systems, there is an increasing need for a mobile communication system with larger capacity, higher throughput, lower latency, and better reliability.

Millimeter Waves (mmWaves) are radio waves with wavelength in the range of 1 millimeter (mm)-10 mm, which corresponds to a radio frequency of 30 GigaHertz (GHz)-300 GHz. Per the definition by the International Telecommunications Union (ITU), these frequencies are also referred to as the Extremely High Frequency (EHF) band. These radio waves exhibit unique propagation characteristics. For example, compared with lower frequency radio waves, mmWaves suffer higher propagation loss, have a poorer ability to penetrate objects, such as buildings, walls, foliage, and are more susceptible to atmosphere absorption, deflection and diffraction due to particles (e.g., rain drops) in the air. On the other hand, due to the smaller wave lengths of the mmWaves, more antennas may be packed in a relatively small area, thereby allowing for the implementation of a high-gain antenna in small form factor. In addition, due to the aforementioned deemed disadvantages, mmWaves have been less utilized than the lower frequency radio waves. The limited utilization of mmWaves also presents unique opportunities for new businesses to acquire the spectrum in this band at a lower cost. The ITU defines frequencies in 3 GHz-30 GHz as Super High Frequency (SHF). Note that some higher frequencies in the SHF band also exhibit similar behavior as radio waves in the EHF band (i.e., mmWaves), such as large propagation loss and the possibility of implementing high-gain antennas in small form factors.

A vast amount of spectrum is available in the mmWave band. For example, the frequencies around 60 GHz, which are typically referred to as the 60 GHz band, are available as unlicensed spectrum in most countries. In the United States, 7 GHz of spectrum around 60 GHz (i.e., 57 GHz-64 GHz) is allocated for unlicensed use. On Oct. 16, 2003, the Federal Communications Commission (FCC) issued a Report and Order that allocated 12.9 GHz of spectrum for high-density fixed wireless services in the United States (i.e., 71-76 GHz, 81-86 GHz, and 92-95 GHz excluding 94.0-94.1 GHz for Federal Government use). The frequency allocation in 71-76 GHz, 81-86 GHz, and 92-95 GHz are collectively referred to as the E-band. The frequency allocation in the E-band is the largest spectrum allocation ever by the FCC as it is 50 times larger than the entire cellular spectrum.

MmWave wireless communication using component electronics has existed for many years. Several companies have developed or are developing mmWave communication systems that can achieve a Giga bits per second (Gbps) data rate. For example, Asyrmatos Incorporated developed an mmWave communication system capable of 10 Gbps data transfer over distances of several kilometers. The transceiver used by Asyrmatos Incorporated is based on photonics, which provides the flexibility of operating in a variety of mmWave bands such as the 140 GHz (F-Band), the 94 GHz (W-Band), the 70/80 GHz (E-Band), and the 35 GHz (Ka-Band). As another example, the GigaBeam Corporation developed multigigabit wireless technologies for the 70 GHz and 80 GHz band. However, these technologies are not suitable for commercial mobile communication due to issues such as cost, complexity, power consumption, and form factor. For example, GigaBeam Corporation's WiFiber G 1.25 Gbps wireless radio requires a two-foot antenna to achieve the antenna gain required for sufficient point-to-point link quality. The component electronics used in these systems, including power amplifiers, low noise amplifiers, mixers, oscillators, synthesizers, waveguides, are too big in size and consume too much power to be applicable in mobile communication.

Recently, many engineering and business efforts have been and are being invested to utilize the mmWaves for short-range wireless communication. A few companies and industrial consortiums have developed technologies and standards to transmit data at a G-bps rate using the unlicensed 60 GHz band within a few meters (i.e., up to 10 meters). Several industrial standards have been developed, e.g., WirelessHD technology, European Computer Manufacturers Association 387 (ECMA-387), and IEEE 802.15.3c, with other organizations also actively developing competing short-range 60 GHz G-bps connectivity technology, e.g., the Wireless Gigabit Alliance (WGA) and the IEEE 802.11 Task Group ad (TGad). Integrated Circuit (IC) based transceivers are also available for some of these technologies. For example, researchers at the Berkeley Wireless Research Center (BWRC) and the Georgia Electronics Design Center (GEDC) have made significant progresses in developing low-cost, low-power 60 GHz Radio Frequency IC (RFIC) and antenna solutions. Researchers from the BWRC have shown that 60 GHz power amplifiers may be designed and fabricated in 130 nanometer (nm) bulk "digital" Complementary Metal-Oxide-Semiconductor (CMOS). A core team of researchers from BWRC co-founded SiBeam Incorporated in 2004 and developed a CMOS based RFIC and baseband modem for WirelessHD technology. At present, the biggest challenge of short-range 60 GHz connectivity technology is the RFIC. As such, much of the engineering efforts have been invested to develop more power efficient 60 GHz RFICs. Many of the designs and technologies can be transferred to RFIC design for other mmWave bands, such as the 70-80-90 GHz band. Although the conventional 60 GHz RFICs still suffer from low efficiency and high cost, advancements in mmWave RFIC technology point to the direction of higher efficiency and lower cost, which may eventually enable communication over larger distance using mmWave RFICs.

Therefore, a need exists for techniques that utilize mmWaves for mobile communication.

SUMMARY OF THE INVENTION

An aspect of the present invention is to address at least the above-mentioned problems and/or disadvantages and to provide at least the advantages described below. Accordingly, an aspect of the present invention is to provide techniques that utilize millimeter Waves (mmWaves) for mobile communication.

In accordance with an aspect of the present invention, a Base Station (BS) for use in a mobile communication system that includes a plurality of BSs capable of communicating with a plurality of Mobile Stations (MSs) is provided. The BS includes a cellular band transceiver for communicating in a cellular band, a millimeter wave mmWave band transceiver for communicating in the mmWave band, and a controller for controlling both the cellular band transceiver and the mmWave band transceiver for communication with an MS.

In accordance with another aspect of the present invention, a MS for use in a mobile communication system that includes a plurality of BSs capable of communicating with a plurality of MSs is provided. The MS includes a cellular band transceiver for communicating in a cellular band, an mmWave band transceiver for communicating in the mmWave band, and a controller for controlling the cellular band transceiver for communication with a BS and for controlling the mmWave band transceiver for communication with one of the BS and an mmWave Access Point (mmAP).

In accordance with yet another aspect of the present invention, a mmAP for use in a mobile communication system that includes a plurality of BSs capable of communicating with a plurality of MSs is provided. The mmWave mmAP includes an mmWave band transceiver for communicating in the mmWave band, and a controller for controlling the mmWave band transceiver for communication with an MS.

In accordance with still another aspect of the present invention, a BS for use in a mobile communication system that includes a plurality of BSs capable of communicating with a plurality of MSs is provided. The BS includes a cellular band transceiver for communicating with an MS in a cellular band, an mmWave band transceiver for communicating with at least one other BS in the mmWave band, and a controller for controlling both the cellular band transceiver and the mmWave band transceiver, wherein the controller controls to form a first beam through which communication is performed in the mmWave band in a first time slot with a first BS and controls to form a second beam through which communication is performed in the mmWave band in a second time slot with a second BS.

In accordance with another aspect of the present invention, a BS for use in a mobile communication system that includes a plurality of BSs capable of communicating with a plurality of MSs is provided. The BS includes a cellular band transceiver for communicating with an MS in a cellular band, an mmWave band transceiver for communicating with at least one other BS in the mmWave band, and a controller for controlling both the cellular band transceiver and the mmWave band transceiver, and for detecting network congestion between the BS and a Packet Data Server/Gateway, wherein, when the controller detects network congestion, the controller controls to form a beam through which communication is performed in the mmWave band with another BS that would result in less congestion between the BS and a Packet Data Server/Gateway.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to techniques for mobile communication. More specifically, exemplary embodiments of the present invention described below relate to techniques that utilize millimeter Waves (mmWaves) for mobile communication.

It should be understood that the following description might refer to terms utilized in various standards merely for simplicity of explanation. For example, the following description may refer to terms utilized in one of the Institute of Electrical and Electronics Engineers (IEEE) 802.16d standard, the IEEE 802.16e standard, the IEEE 802.16m standard, the $3^{rd}$ Generation Partnership Project (3GPP) High Speed Pack Access (HSPA) standard, the 3GPP Long Term Evolution (LTE) standard, the 3GPP LTE Advanced (LTE-A) standard, and their evolutions. However, this description should not be interpreted as being limited to any particular standard. Independent of the mechanism used for mmWave mobile communication, it is preferable to implement closed-loop transformation-codebook based transmit beamforming and it is advantageous to utilize mmWaves for mobile communication for that ability to conform to a standardized mechanism.

While the exemplary embodiments of the present invention are disclosed in the context of communication with mmWaves, the present invention is similarly applicable for use with other communication medium, e.g., radio waves with a frequency of 10 GigaHertz (GHz)-30 GHz that exhibit similar properties as mmWaves, and radio waves with terahertz frequencies, infrared, visible light, and other optical media. For convenience in explanation, the term 'cellular band' denotes frequencies from a few hundred MegaHertz (MHz) to a few GHz and the term 'mmWave band' denotes frequencies from a few tens of GHz to a few hundred GHz. The key distinction between the cellular band and the mmWave band is that the radio waves in the cellular band have less propagation loss and may be used to achieve better coverage but may require larger antennas. On the other hand, radio waves in mmWave band suffer higher propagation loss but lend themselves well to high-gain antennas or antenna arrays design in a small form factor.

MmWaves suffer larger propagation loss than radio waves with lower frequencies. This larger propagation may can become pronounced when mmWaves are deployed for local-area (i.e., 10 meters (m)~100 m) or wide-area (i.e., >100 m) communication. To compensate for the large propagation loss, antennas with high antenna gain are often used for mmWave communication. In recent years, a number of cost-effective antenna and Radio Frequency Integrated Circuit (RFIC) solutions became available for mmWave communication. In addition, due to the small wavelength of mmWaves (e.g., $\lambda$=5 millimeters (mm) for 60 GHz carrier frequency), the antenna size and separation can be made very small (around $\lambda/2$) for beamforming purposes. The small size and separation of mmWave antennas allows for a large number of antennas in a small area, which enables high gain antenna implementation in a relatively small area. In addition, with a large number of antennas and high-gain (and thus narrow) beams, antenna technologies, such as Spatial Division Multiple Access (SDMA) and spatial reuse, can be readily implemented.

One system design approach is to leverage the existing technologies for mobile communication and utilize the mmWave channel as additional spectrum for data communication. In this type of system, communication stations, including different types of Mobile Stations (MSs), Base Stations (BSs), and Relay Stations (RSs), communicate using both the cellular bands and the mmWave bands. The cellular bands typically operate at a frequency of a few hundred MHz to a few GHz. Compared with mmWaves, the radio waves in these frequencies suffer less propagation loss, can better penetrate obstacles, and are less sensitive to Non-Line-Of-Sight (NLOS) communication or other impairments such as absorption by oxygen, rain, and other particles in the air. Therefore, it is more advantageous to transmit certain important control channel signals via cellular radio frequencies, while utilizing the mmWaves for high data rate communication. An example of an mmWave mobile communication is described below with reference to FIG. 1.

Figure 1:
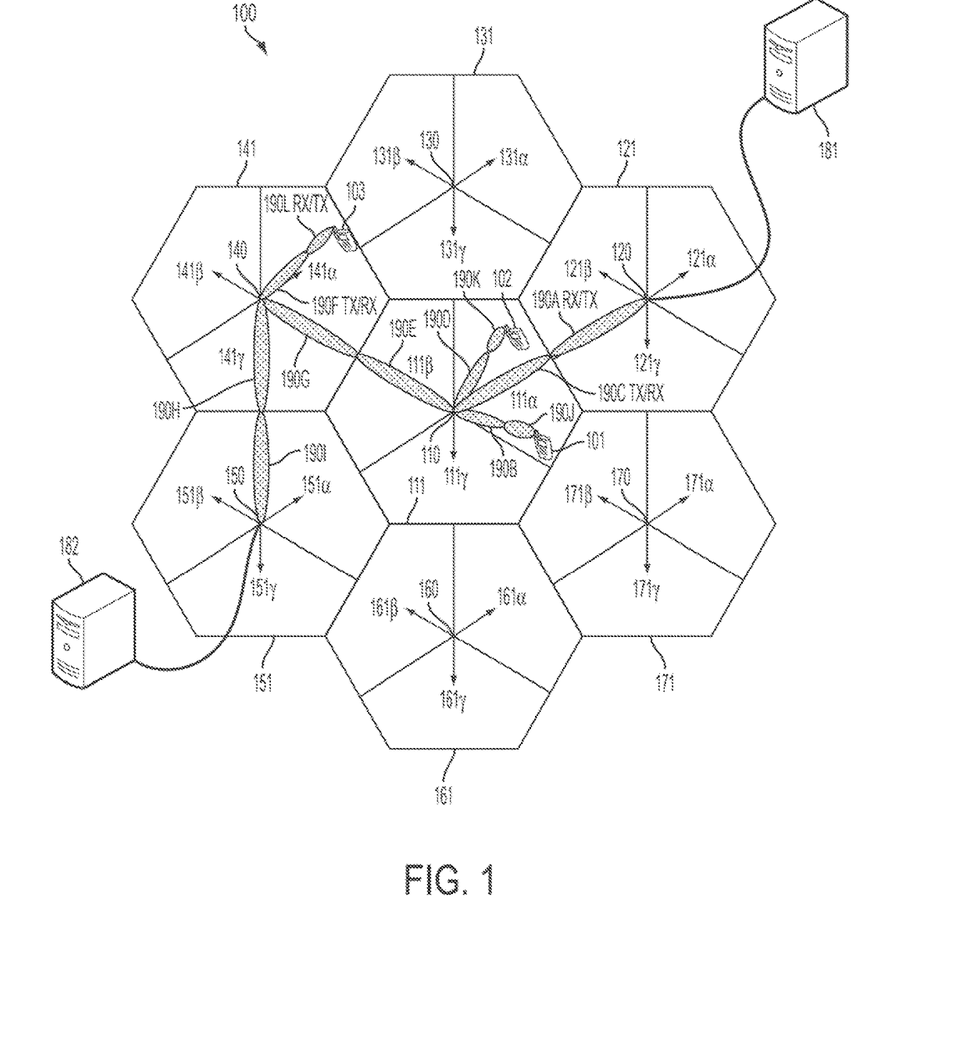
FIG. 1 illustrates a mobile communication system that utilizes millimeter Waves (mmWaves) according to an exemplary embodiment of the present invention.

FIG. 1 illustrates a mobile communication system that utilizes mmWaves according to an exemplary embodiment of the present invention.

Regarding FIG. 1, a mobile communication system 100 comprises various BSs including BS 110, BS 120, BS 130, BS 140, BS 150, BS 160, and BS 170, which provides service in Cell 111, Cell 121, Cell 131, Cell 141, Cell 151, Cell 161, and Cell 171, respectively. The number and configuration of the BSs and cells shown in FIG. 1 and described herein is merely for convenience in explanation. The present invention may be used with a mobile communication system having a different number or configuration of BSs and cells. Herein, the various BSs may each provide service to any number of sectors within their respective cell. For example, as shown in FIG. 1, each of the various cells may have three sectors. In the case where each of the various cells have three sectors, as shown in FIG. 1, Cell 111 includes Sector 111α, 111β, and 111γ; Cell 121 includes Sector 121α, 121β, and 121γ; Cell 131 includes Sector 131α, 131β, and 131γ; Cell 141 includes Sector 141α, 141β, and 141γ; Cell 151 includes Sector 151α, 151β, and 151γ; Cell 161 includes Sector 161α, 161β, and 161γ; and Cell 171 includes Sector 171α, 171β, and 171γ. While the various cells are described herein has having three sectors, the present invention is not limited thereto and is equally applicable to the BSs providing service to a different number of sectors or no sectors within their cells.

The mobile communication system 100 further includes MS 101, MS 102, and MS 103. Herein, the number of MSs shown in FIG. 1 and described herein is merely for convenience in explanation. The present invention may be used with a mobile communication system having any number of MSs.

The mobile communication system 100 further includes Packet Data Server/Gateway 181 and Packet Data Server/Gateway 182. The various BSs are connected to at least one of Packet Data Server/Gateway 181 and Packet Data Server/Gateway 182. A given BS may be connected to at least one of Packet Data Server/Gateway 181 and Packet Data Server/

Gateway 182 via a direct or dedicated communication line such as an optical fiber, a coaxial cable, or a T1 line. A given BS may also connect to at least one of Packet Data Server/Gateway 181 and Packet Data Server/Gateway 182 through an Internet Protocol (IP) network. As shown in FIG. 1, Packet Data Server/Gateway 181 is directly coupled to BS 120 and Packet Data Server/Gateway 182 is directly coupled to BS 150. Herein, the configuration and number of Packet Data Server/Gateways shown in FIG. 1 and described herein is merely for convenience in explanation. The present invention may be used with a mobile communication system having any configuration and number of Packet Data Server/Gateways. The Packet Data Server/Gateways 181 and 182 may perform functions that include, but are not limited to, routing data to and from other networks (e.g., the Internet), mobility management, authentication, authorization, and accounting, etc. In certain cases, some functions of the Packet Data Server/Gateways may be implemented in separate entities, such as an Authentication, Authorization, and Accounting (AAA) server or a Mobility Management Entity (MME).

The over-the-air communications are transmitted in one or multiple mmWave bands. Multiple mmWave bands may be used for frequency domain multiplexing (e.g., Frequency Division Multiplexing (FDM) or Orthogonal Frequency Division Multiplexing (OFDM)) or frequency reuse. MmWaves suffer larger propagation loss than electromagnetic waves in lower frequencies. This larger propagation loss can become pronounced when mmWaves are deployed for local-area (10 m~100 m) and wide-area (>100 m) communication. To compensate for the large propagation loss, antennas with high antenna gains are often used in mmWave communication. Fortunately, a number of cost-effective RFIC and antenna solutions are available for mmWave communication. Also, research is being conducted to further drive down the cost, size, and power consumption of these RFIC and antenna solutions. In addition, due to the small wavelength of mmWaves (e.g., $\lambda=5$ millimeters (mm) for a 60 GHz carrier frequency), the antenna size and separation can be made very small (around $\lambda/2$) for beam-forming purpose. The small size and separation of mmWave antennas allow a large number of antennas in a small area, which enables high gain antenna implementation at the BSs and MSs. In addition, with a large number of antennas and high-gain (and thus narrow) beams, Spatial Division Multiple Access (SDMA) and spatial reuse can be readily implemented. For example, as shown in FIG. 1, BS 110 communicates with MS 101 via Beam 190B, communicates with MS 102 via Beam 190D, communicates with BS 120 via Beam 190C, and communicates with BS 140 via Beam 190E.

A BS may communicate with another BS directly using an mmWave band. For example, as shown in FIG. 1, BS 110 communicates with BS 120 directly in an mmWave band. In order to achieve good link quality, BS 110 forms Beam 190C pointing to BS 120 while BS 120 forms Beam 190A pointing to BS 110. Similarly, as shown in FIG. 1, BS 110 communicates with BS 140 directly in an mmWave band. In order to achieve good link quality, BS 110 forms Beam 190E pointing to BS 140 while BS 140 forms Beam 190G pointing to BS 110. In addition, as shown in FIG. 1, BS 140 communicates with BS 150 directly in an mmWave band. In order to achieve good link quality, BS 140 forms Beam 190H pointing to BS 150 while BS 150 forms Beam 190I pointing to BS 140. The beam patterns and directions shown in FIG. 1 is only for the purpose of illustration. Beams can be formed in different patterns and may not necessarily point from the transmitter directly to the receiver. This is particularly the case when there are scatters and reflectors in the environment, which creates multiple paths that the radio waves can travel from the transmitter to the receiver.

For convenience in explanation, direct communication between BSs will be described in more detail below using the communication between BS 110 and BS 120 as an example. However, the description of the direct communication between BS 110 and BS 120 is equally applicable to direct communication between any two BSs. Regarding the direct communication between BS 110 and BS 120, the antenna gains of Beam 190C and Beam 190A may significantly improve the quality of communication link between BS 110 and BS 120. The mmWave communication between BS 110 and BS 120 may be bidirectional. For example, Time Division Duplexing (TDD) may be used for communication between BS 110 and BS 120. In other words, BS 110 may transmit to BS 120 using at least one mmWave band in a first time slot and BS 120 may transmit to BS 110 using the said at least one mmWave band in a second time slot. Alternatively, Frequency Division Duplexing (FDD) may be used. In other words, BS 110 may transmit to BS 120 using at least a first mmWave band and BS 120 may transmit to BS 110 using at least a second mmWave band. The use of direct mmWave communication link among BSs mitigates the need of backhaul support for each BS. This can greatly reduce the cost of deploying the mmWave mobile communication system and expedite the deployment.

Regarding MS 101, MS 102, and MS 103, BS 110 communicates with MS 101 and MS 102, and BS 140 communicates with MS 103. Again, in order to achieve good quality of communication, BS 110 forms Beam 190B pointing to MS 101 while MS 101 forms Beam 190J pointing to BS 110. Similarly, BS 110 forms Beam 190D pointing to MS 102 while MS 102 forms Beam 190K pointing to BS 110. In addition, BS 140 forms Beam 190F pointing to MS 103 while MS 103 forms Beam 190L pointing to BS 140. For convenience in explanation, communication between a BS and an MS will be described in more detail below using the communication between BS 110 and MS 101 as an example. However, the description of the communication between BS 110 and MS 101 is equally applicable to communication between any BS and MS. Regarding the communication between BS 110 and MS 101, the mmWave communication between them may be bidirectional. For example, TDD may be used for the communication between BS 110 and MS 101. In other words, BS 110 may transmit to MS 101 using at least one mmWave band in a first time slot and MS 101 may transmit to BS 110 using the said at least one mmWave band in a second time slot. Alternatively, FDD may be used. In other words, BS 110 may transmit to MS 101 using at least a first mmWave band and MS 101 may transmit to BS 110 using at least a second mmWave band.

One way to incorporate mmWave communication into a mobile communication system is to use the mmWave bands for data communication while leveraging the lower-frequency bands for control and mobility management. As mentioned earlier, lower frequency bands typically experience less propagation loss and can penetrate objects (e.g., buildings, foliage, etc.) better. It is also easier to radiate a large amount of power with a wide antenna pattern in lower frequency bands. Therefore, it is often easier to use the lower frequency bands to achieve good coverage and reliable control channel signaling than to use the mmWave bands. In addition, there are already many cellular and mobile broadband technologies that may be leveraged for mobility management and control channel signaling, such as 3GPP HSPA and LTE systems (including their evolutions, e.g., LTE-A), and WiMAX systems (such as IEEE 802.16d, 16e, 16m, and their evolutions).

In one exemplary embodiment of the present invention, in a mobile communication system, a communication station (e.g. a BS or an MS) transmits a first signal using radio frequencies lower than the frequencies of mmWaves and transmits a second signal using mmWaves. Correspondingly, a communication station may receive a first signal in radio frequencies lower than the frequencies of mmWaves and receives a second signal in mmWaves. As an example, in a mobile communication system with an mmWave data channel, a BS may transmit some control channels using cellular bands (typically from a few hundred MHz to a few GHz), and transmit some data packets using mmWave bands. Though they may have different terminologies in different standards or technologies, cellular or cellular based systems typically have signals or control channels for at least one of time and frequency synchronization, cell identification, system acquisition, resource allocation, and other functions to maintain communication links or to support data channel communication, such as power control, acknowledgement, etc.

For the purpose of illustration, the following terminology may be referred to herein, including 'synchronization channel,' 'broadcast control channel,' 'pilot channels,' 'packet data control channel,' 'cellular packet data channel,' 'MmWave packet data channel,' 'acknowledgement channel, and 'power control channel.'

The term 'synchronization channel' refers to the channel or signal that carries fundamental identities for a BS, e.g., a cell IDentifier (ID), or a preamble sequence that identifies the BS among its neighbors. This channel may also carry additional information such as bandwidth of the system, protocol version, etc.

The term 'broadcast control channel' refers to the channel or signal that carries more extensive configurations of a BS, which includes, but is not limited to, BS ID and information needed to decode other data channels and control channels, etc.

Regarding the term 'pilot channels,' there are all kinds of pilot channels in mobile communication systems. Sometimes they are also referred to by other terminologies, such as reference signals, sounding signals, midambles, etc. There are pilots in both the link from a BS to an MS, referred to as the DownLink (DL), and from an MS to a BS, referred to as the UpLink (UL). The pilot may be either a common pilot or a dedicated pilot. The common pilot may be used by all MSs to estimate channel state information or to demodulate data or control channels. A dedicated pilot is typically only intended for use by one or a group of target MSs. Other MSs may not be able to use the said dedicated pilot for channel estimation or demodulation. However, a BS may transmit another dedicated pilot to another MS or another group of MSs. A pilot may undergo Time-Division-Multiplexing (TDM), or FDM, including OFDM, or code-division-multiplexing (CDM) with data channel or other control channels.

The term 'packet data control channel' refers to the channel that conveys control information required for an MS to transmit or receive its packets. For example, a BS may use the packet data control channel to indicate to an MS that the MS may transmit one or multiple packets on certain uplink resources with a certain modulation coding scheme (an allowed power level may also be indicated). Alternatively, a BS may use the packet data control channel to indicate to an MS that the BS is transmitting or is going to transmit one or multiple packets on certain downlink resources with certain modulation coding scheme (the power level may also be indicated) to the MS.

Regarding the term 'cellular packet data channel,' data packets may be transmitted to or from MSs using the packet data channel in cellular bands. These packet data channels may adopt a design and channel structure similar to the packet data channels in LTE systems or mobile WiMAX systems. Advanced communication technologies such as Orthogonal Frequency Division Multiple Access (OFDMA), Single Carrier-Frequency Division Multiple Access (SC-FDMA), higher order modulation, turbo code, Hybrid Automatic Repeat reQuest (HARQ), and Multiple Input Multiple Output (MIMO) may be applied in similar fashion as in LTE systems or mobile WiMAX systems. Compared with communications using mmWave bands, these packet data channels use cellular bands and can have better coverage. They can be very beneficial in areas where communication using the mmWave bands is not available.

Regarding the term 'mmWave packet data channel,' data packets may be transmitted to or from MSs using the packet data channel in the mmWave bands. Due to the larger amount of spectrum available in the mmWave bands, the data rate provided by these channels may be much higher than that provided in cellular bands. These packet data channels are used to achieve data communications with very high throughput and low latency, thus greatly improving user experience and enabling new mobile communication applications and businesses.

Regarding the term 'acknowledgement channel,' some data channel transmissions may require acknowledgement from the receiver. For example, HARQ may be used in packet data channel transmission in many mobile communication systems such as 3GPP HSPA and LTE systems, and mobile WiMAX systems. In order to assist HARQ operation, acknowledgement from the receiver is required. The acknowledgement channel sometimes may be referred to by other terms such as an HARQ Indicator channel.

Regarding the term 'power control channel,' the transmit power from an MS often needs to be controlled in order to maintain reliable communication and mitigate interference. The power control command may be transmitted to an MS at a different rate. In some systems, the power control rate may be as fast as 1500 Hertz (Hz) while in some other systems the power control rate may be as slow as 50 Hz. In some systems, the power control command may be transmitted in an as needed basis.

Returning to the exemplary embodiment of the present invention, in a mobile communication system, a BS may transmit at least one control channel in at least one cellular band, and transmit at least one data packet in at least one mmWave band. Correspondingly, an MS may receive the said at least one control channel in the said at least one cellular band, and receive the said at least one data packet in the said at least one mmWave band. The said at least one control channel may be one of a synchronization channel, a broadcast control channel, a packet data control channel, a power control channel, an acknowledgement channel, and another control channel. The said MS may also transmit another data packet in another mmWave band, which may or may not be the same as the said at least one mmWave band that the said BS uses to transmit to the said MS.

Conversely, in a mobile communication system, an MS may transmit at least one control channel in at least one cellular band, and transmit at least one data packet in at least one mmWave band. Correspondingly, a BS may receive the said at least one control channel in the said at least one cellular band, and receive the said at least one data packet in the said at least one mmWave band. The said at least one control channel may be one of a pilot channel, a sounding channel, an acknowledgment channel, a channel state information feedback, a bandwidth request, and another control channel. The said BS may also transmit another data packet in another mmWave band, which may or may not be the same as the said at least one mmWave band that the said MS uses to transmit to the said BS.

In another exemplary embodiment of the present invention, a first communication station may transmit at least one channel state information feedback in a cellular band to a second communication station. The channel state information may indicate the channel quality of at least one mmWave band.

In another exemplary embodiment of the present invention, a first communication station may transmit to a second communication station a first data packet in at least one cellular band and a second data packet in at least one mmWave band.

According to an exemplary embodiment of the present invention, a mobile communication system that utilizes mmWaves may also include different kinds of BSs, MSs, and RSs that can transmit control channels, or data channels, or both using mmWave bands. One example of such a mobile communication system that utilizes mmWaves is described below with reference to FIG. 2.

Figure 2:
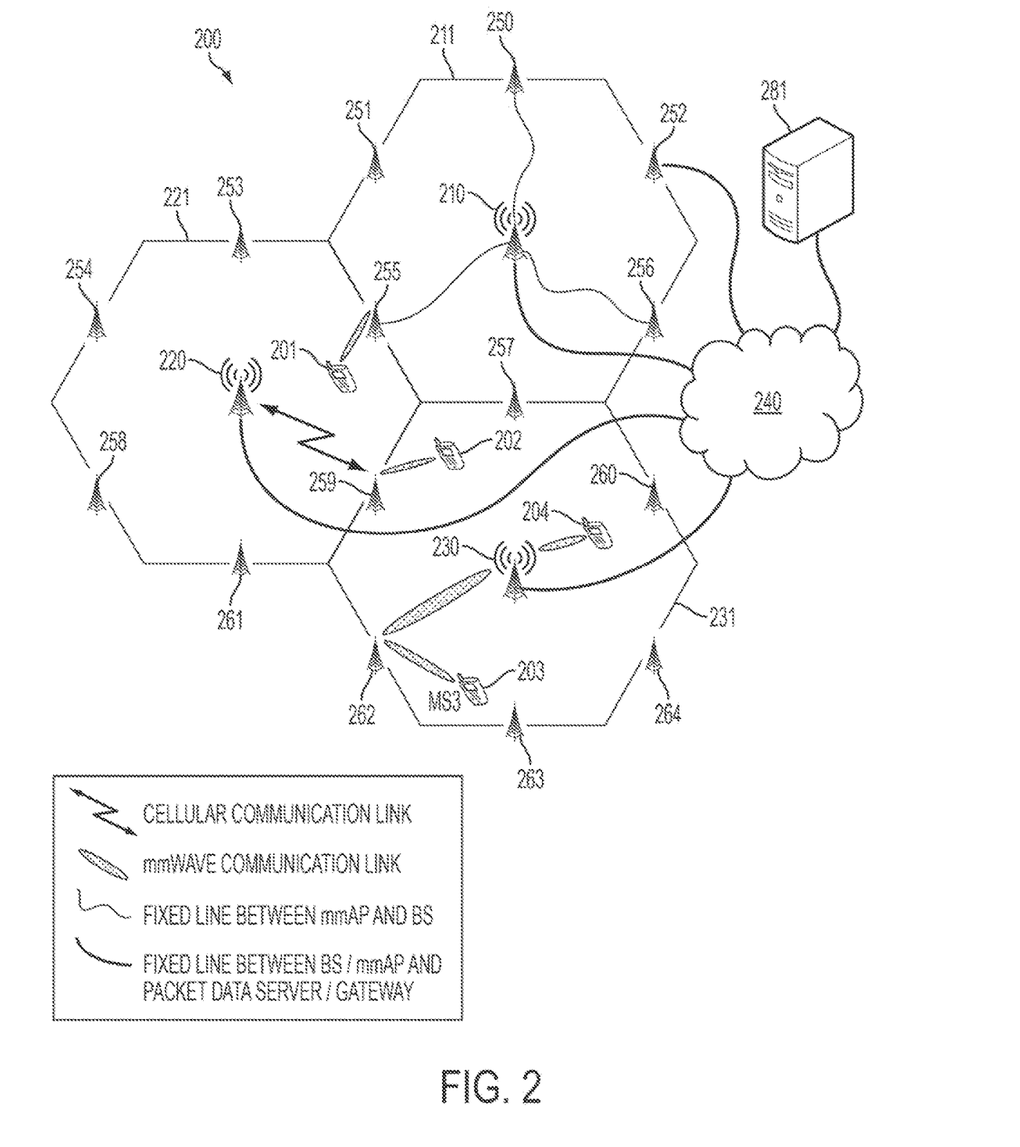
FIG. 2 illustrates a mobile communication system that utilizes mmWaves according to an exemplary embodiment of the present invention.

FIG. 2 illustrates a mobile communication system that utilizes mmWaves according to an exemplary embodiment of the present invention Regarding FIG. 2, a mobile communication system 200 comprises various BSs including BS 210, BS 220, and BS 230, which provides service in Cell 211, Cell 221, and Cell 231, respectively. Herein, BS 210, BS 220, and BS 230 provide service using the cellular bands due to the aforementioned advantages of radio waves in the cellular bands over the mmWaves. However, the BSs may also provide service using mmWaves. For example, as shown in FIG. 2, BS 230 may communicate with MS 204 using mmWaves. The number and configuration of the BSs and cells shown in FIG. 2 and described herein is merely for convenience in explanation. The present invention may be used with a mobile communication system having a different number or configuration of BSs and cells. Although not shown herein, the various BSs may each provide service to any number of sectors within their respective cell.

The mobile communication system 200 further includes various mmWave Access Points (mmAPs), including mmAP 250, mmAP 251, mmAP 252, mmAP 253, mmAP 254, mmAP 255, mmAP 256, mmAP 257, mmAP 258, mmAP 259, mmAP 260, mmAP 261, mmAP 262, mmAP 263, and mmAP 264. The various mmAPs provide service using the mmWave bands. However, the mmAPs may also provide service using the cellular bands.

The mobile communication system 200 further includes MS 201, MS 202, MS 203, and MS 204. Herein, the number of MSs shown in FIG. 2 and described herein is merely for convenience in explanation. The present invention may be used with a mobile communication system having any number of MSs.

The mobile communication system 200 further includes Packet Data Server/Gateway 281. The various BSs are connected to Packet Data Server/Gateway 281. In addition, mmAP 252 is connected to Packet Data Server/Gateway 281. A communication connection to Packet Data Server/Gateway 281 may be, as shown in FIG. 2, through an Internet Protocol (IP) network. Alternatively, or in addition, the communication connection to Packet Data Server/Gateway 281 may be a direct or dedicated communication line such as an optical fiber, a coaxial cable, or a T1 line. Herein, the configuration and number of Packet Data Server/Gateways shown in FIG. 2 and described herein is merely for convenience in explanation. The present invention may be used with a mobile communication system having any configuration and number of Packet Data Server/Gateways. The Packet Data Server/Gateway 281 may perform functions that include, but are not limited to, routing data to and from other networks (e.g., the Internet), mobility management, authentication, authorization, and accounting, etc. In certain cases, some functions of the Packet Data Server/Gateway 281 may be implemented in separate entities, such as an Authentication, Authorization, and Accounting (AAA) server or a Mobility Management Entity (MME).

In an exemplary embodiment of the present invention, the mmAPs may communicate with Packet Data Server/Gateway 281 directly, via a network, or via a BS through one of a fixed line, the mmWave band, or the cellular band. For example, as shown in FIG. 2, the mmAP 250 and mmAP 256 communicates with BS 210 using the fixed line, and the BS 210 communicates with Packet Data Server/Gateway 281 via a network. In another example, as shown in FIG. 2, the mmAP 252 communicates with Packet Data Server/Gateway 281 via a network.

In an exemplary embodiment of the present invention, a communication station communicates with an MS using at least one mmWave band and communicates with a BS or a Packet Data Server/Gateways using fixed line communication link such as coaxial or fiber-optic cable. For example, as shown in FIG. 2, the mmAP 255 communicates with MS 201 using the mmWave band and communicates with BS 210 using a fixed line. This allows mmAP 255 to provide high-speed access to MSs, such as MS 201, while the BSs provide good coverage for the overall network.

In an exemplary embodiment of the present invention, a communication station communicates with an MS using at least one mmWave band and communicates with a BS using a communication link in at least one cellular band. For example, as shown in FIG. 2, mmAP 259 communicates with MS 202 using an mmWave band and communicates with BS 220 using a cellular band.

In an exemplary embodiment of the invention, a communication station communicates with an MS using at least a first mmWave band and communicates with a BS using at least a second mmWave band. The first mmWave band may or may not be the same as the second mmWave band. For example, as shown in FIG. 2, mmAP 262 communicates with MS 203 using a first mmWave band and communicates with BS 230 using a second mmWave band.

In the example shown in FIG. 2, mmAP 255 may be a femto BS that communicates with MSs using mmWave bands; mmAP 259 can be an RS that communicates with MSs using mmWave bands and communicates with BSs using cellular bands; and mmAP 262 may be an RS that communicates with MSs using mmWave bands while communicating with BSs using mmWave bands.

An example of a mobile communication system that utilizes mmWaves is described below with reference to FIG. 3.

Figure 3:
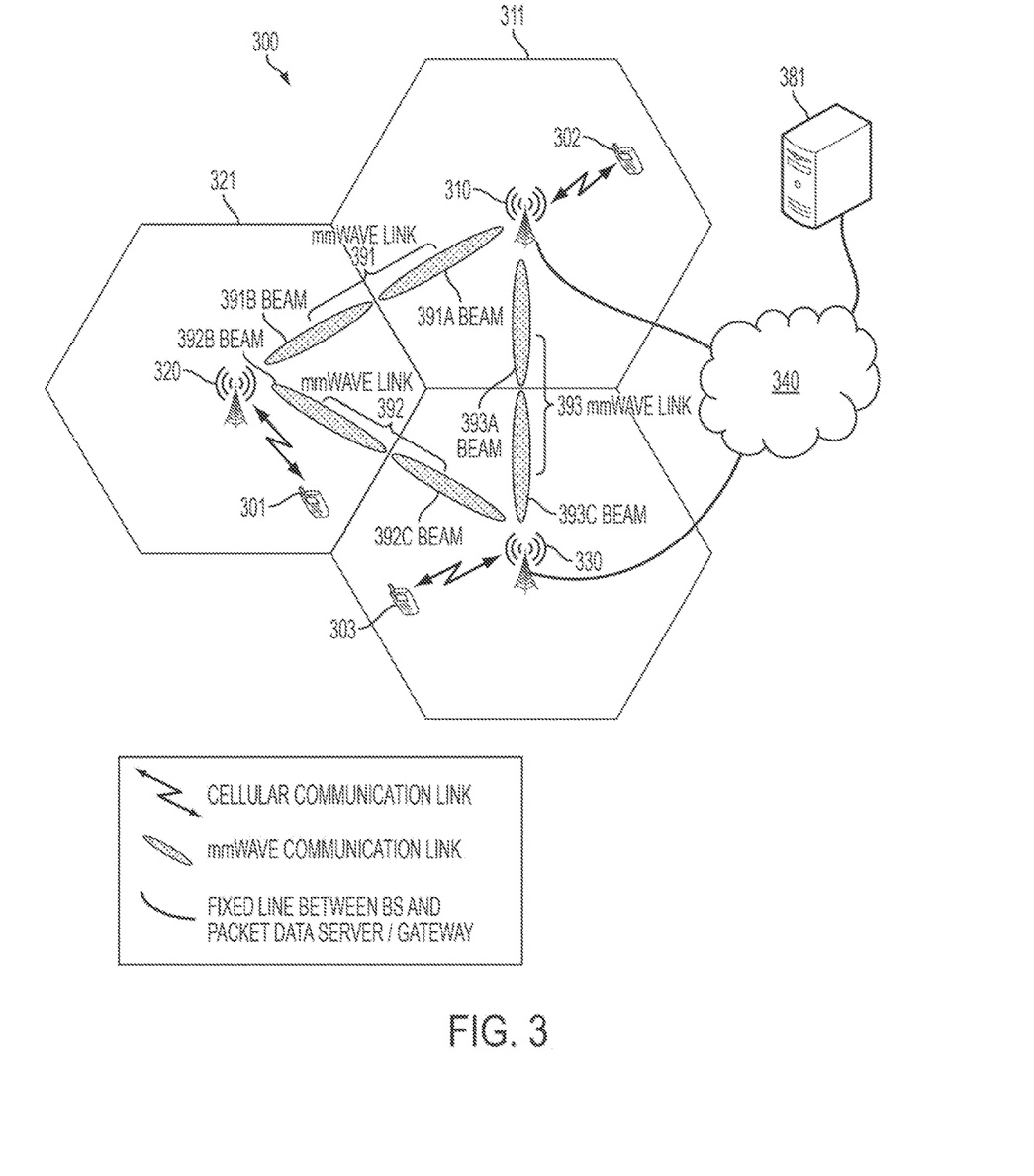
FIG. 3 illustrates a mobile communication system that utilizes mmWaves according to an exemplary embodiment of the present invention.

FIG. 3 illustrates a mobile communication system that utilizes mmWaves according to an exemplary embodiment of the present invention Regarding FIG. 3, a mobile communication system 300 comprises various BSs including BS 310, BS 320, and BS 330, which provides service in Cell 311, Cell 321, and Cell 331, respectively. Herein, BS 310, BS 320, and BS 330 provide service to MSs using the cellular bands due to the aforementioned advantages of radio waves in the cellular bands over the mmWaves. The number and configuration of the BSs and cells shown in FIG. 3 and described herein is merely for convenience in explanation. The present invention may be used with a mobile communication system having a different number or configuration of BSs and cells. Although not shown herein, the various BSs may each provide service to any number of sectors within their respective cell.

The mobile communication system 300 further includes MS 301, MS 302, and MS 303. Herein, MS 301 communicates with BS 320 over the cellular bands, MS 302 communicates with BS 310 over the cellular bands, and MS 303 communicates with BS 330 over the cellular bands. The number of MSs shown in FIG. 3 and described herein is merely for convenience in explanation. The present invention may be used with a mobile communication system having any number of MSs.

The mobile communication system 300 further includes Packet Data Server/Gateway 381. Various BSs may be connected to Packet Data Server/Gateway 381. For example, as shown in FIG. 3, BS 310 and BS 330 are connected to Packet Data Server/Gateway 381. A communication connection to Packet Data Server/Gateway 381 may be, as shown in FIG. 3, through an Internet Protocol (IP) network. Alternatively, or in addition, the communication connection to Packet Data Server/Gateway 381 may be a direct or dedicated communication line such as an optical fiber, a coaxial cable, or a T1 line. Herein, the configuration and number of Packet Data Server/Gateways shown in FIG. 3 and described herein is merely for convenience in explanation. The present invention may be used with a mobile communication system having any configuration and number of Packet Data Server/Gateways. The Packet Data Server/Gateway 381 may perform functions that include, but are not limited to, routing data to and from other networks (e.g., the Internet), mobility management, authentication, authorization, and accounting, etc. In certain cases, some functions of the Packet Data Server/Gateway 381 may be implemented in separate entities, such as an Authentication, Authorization, and Accounting (AAA) server or a Mobility Management Entity (MME).

According to an exemplary embodiment of the presented invention, while BS 310 and BS 330 are connected to the Packet Data Server/Gateway 381 through fixed line communication links, BS 320 is not directly connected to the network or Packet Data Server/Gateway 381 via a fixed line communication link. Herein, BS 310, BS 320, and BS 330 may communicate using mmWave communication links, i.e., mmWave Link 391, mmWave Link 392, and mmWave Link 393 shown in FIG. 3. It is noted that mmWave Link 391, mmWave Link 392, and mmWave Link 393 may be dynamically formed. The mmWave Link 391 is enabled by BS 310 forming a Beam 391A pointing to BS 320 and BS 320 forming a Beam 391B pointing to BS 310. The mmWave Link 392 is enabled by BS 320 forming a Beam 392B pointing to BS 330 and BS 330 forming a Beam 392C pointing to BS 320. The mmWave Link 393 is enabled by BS 330 forming a Beam 393C pointing to BS 310 and BS 310 forming a Beam 393A pointing to BS 330.

BS 320 may communicate with the Packet Data Server/Gateway 381 through BS 310 by using mmWave Link 391 in a first time slot and may communicate with the Packet Data Server/Gateway 381 through BS 330 by using mmWave Link 392 in a second time slot. Because of dynamic beamforming, a single transmit antenna array may be used for BS 320 to transmit to BS 310 in the first time slot and to transmit to BS 330 in the second time slot. Likewise, a single receive antenna array may be used for BS 320 to receive from BS 310 in a third time slot and to receive from BS 330 in a fourth time slot. Note that the transmit antenna array may or may not be the same as the receive antenna array. Depending on the duplexing schemes, the first time slot may or may not be the same as the third time slot, the second time slot may or may not be the same as the fourth time slot.

The network architecture described above with respect to FIG. 3 may be useful in balancing load and adapting to network congestion. For example, if the link from BS 310 to the Packet Data Server/Gateway 381 is congested, BS 320 can route its data through BS 330. If the link from BS 330 to the Packet Data Sever/Gateway is congested, BS 320 can route its data through BS 310. Similarly, depending on the network congestion and load of the backhaul links, BS 310 can also use the mmWave Link 393 to route its data through BS 330. BS 330 can also use the mmWave Link 293 to route its data through BS 310. These load balance and congestion avoidance techniques may improve network utilization and reduce latency of the network.

For the purpose of illustration, the exemplary embodiments of the present invention have, for convenience in explanation, been described in the context of using only BSs and MSs. However, mobile communication technology has evolved such that a person with ordinary skill of the art understands that other advanced system topology, such as relay communication among BSs, direct communication among MSs, and different kinds of cooperative communication, may also be supported. Accordingly, the present invention is similarly applicable in such communication systems.

Figure 4:
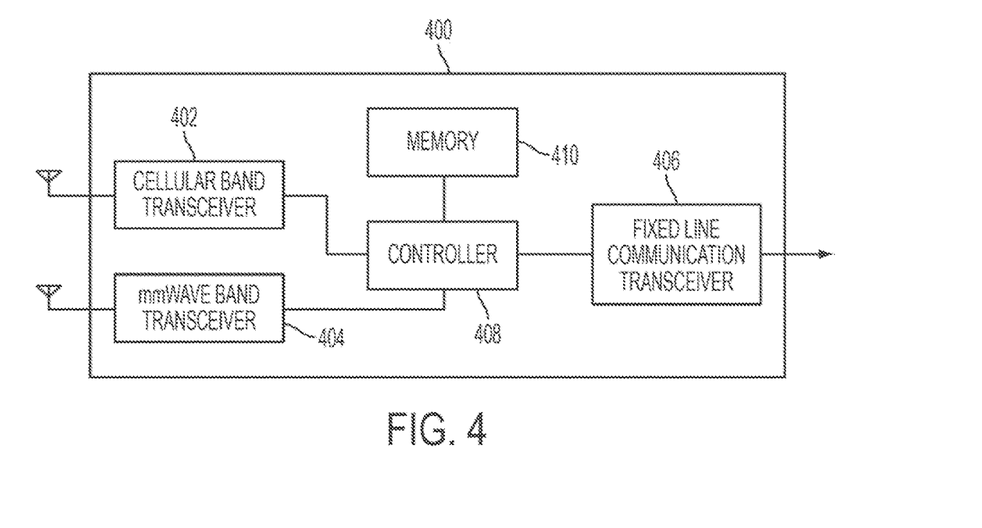
FIG. 4 is a block diagram illustrating a Base Station (BS) in a wireless communication system according to an exemplary embodiment of the present invention.

FIG. 4 is a block diagram illustrating a BS in a wireless communication system according to an exemplary embodiment of the present invention.

Referring to FIG. 4, the BS 400 includes a cellular band transceiver 402, mmWave band transceiver 404, a fixed line communication transceiver 406, a controller 408, and a memory 410. The BS 400 may include any number of additional structural elements. However, a description of additional structural elements of the BS 400 is omitted for conciseness.

The cellular band transceiver 402 includes an antenna system, a receiver, and a transmitter that operate in the cellular band. The antenna system is used to transmit signals to and receive signals from the air. The receiver converts a signal in the cellular band received through the antenna system into a baseband signal and demodulates the baseband signal. For example, the receiver may include a Radio Frequency (RF) processing block, a demodulation block, a channel decoding block and the like. The RF processing block converts a signal in the cellular band received through the antenna system into a baseband signal. The demodulation block may be comprised of a Fast Fourier Transform (FFT) operator for extracting data placed on each subcarrier from the signal received from the RF processing block and the like. The channel decoding block may comprise a demodulator, a deinterleaver, a channel decoder and the like. The transmitter converts a baseband signal into a signal in the cellular band and transmits the signal in the cellular band through an antenna system. For example, the transmitter may include a channel encoding block, a modulation block and an RF processing block. The channel encoding block may include a channel encoder, an interleaver, a modulator and the like. The modulation block may comprise an Inverse Fast Fourier Transform (IFFT) operator for placing transmitted data on a plurality of orthogonal subcarriers and the like. In an OFDM system, the modulation block may comprise the IFFT operator. In a Code Division Multiple Access (CDMA) system, the IFFT operator may be replaced with a code spreading modulator and the like. The RF processing block converts a baseband signal received from the modulation block into a signal in the cellular band and outputs the signal in the cellular band through the antenna system.

The mmWave band transceiver 404 includes an antenna system, a receiver, and a transmitter that operate in the mmWave band. The antenna system is used to transmit signals to and receive signals from the air. Herein, the antenna system may form one or more directional beams for communication in the mmWave band as described further above. The receiver converts a signal in the mmWave band received through the antenna system into a baseband signal and demodulates the baseband signal. For example, the receiver may include an RF processing block, a demodulation block, a channel decoding block and the like. The RF processing block converts a signal in the mmWave band received through the antenna system into a baseband signal. The demodulation block may be comprised of an FFT operator for extracting data placed on each subcarrier from the signal received from the RF processing block and the like. The channel decoding block may comprise a demodulator, a deinterleaver, a channel decoder and the like. The transmitter converts a baseband signal into a signal in the mmWave band and transmits the signal in the mmWave band through an antenna system. For example, the transmitter may include a channel encoding block, a modulation block and an RF processing block. The channel encoding block may include a channel encoder, an interleaver, a modulator and the like. The modulation block may comprise an IFFT operator for placing transmitted data on a plurality of orthogonal subcarriers and the like. In an OFDM system, the modulation block may comprise the IFFT operator. In a CDMA system, the IFFT operator may be replaced with a code spreading modulator and the like. The RF processing block converts a baseband signal received from the modulation block into a signal in the mmWave band and outputs the signal in the mmWave band through the antenna system.

The fixed line communication transceiver 406 facilities fixed line communication with other network entities within a wireless communication system, such as other BSs, a Packet Data Server/Gateway, and a mmAP.

The controller 408 controls overall operations of the BS 400. The operations of the BS 400 include any of the operations explicitly or implicitly described above as being performed by a BS. In addition, the controller 408 generates data to be transmitted and process data to be received.

The memory 410 stores programs used by controller 408 for the operations of the BS 400 and various data including any of the information and/or algorithms discussed herein as being received, transmitted, retained or used by a BS.

Figure 5:
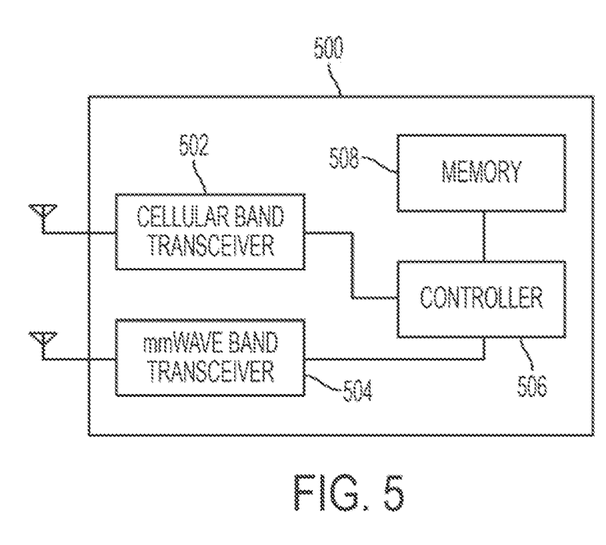
FIG. 5 is a block diagram illustrating a Mobile Station (MS) in a wireless communication system according to an exemplary embodiment of the present invention.

FIG. 5 is a block diagram illustrating an MS in a wireless communication system according to an exemplary embodiment of the present invention.

Referring to FIG. 5, the MS 500 includes a cellular band transceiver 502, mmWave band transceiver 504, a controller 506, and a memory 508. The MS 500 may include any number of additional structural elements. However, a description of additional structural elements of the MS 500 is omitted for conciseness.

The cellular band transceiver 502 includes an antenna system, a receiver, and a transmitter that operate in the cellular band. The antenna system is used to transmit signals to and receive signals from the air. The receiver converts a signal in the cellular band received through the antenna system into a baseband signal and demodulates the baseband signal. For example, the receiver may include an RF processing block, a demodulation block, a channel decoding block and the like. The RF processing block converts a signal in the cellular band received through the antenna system into a baseband signal. The demodulation block may be comprised of an FFT operator for extracting data placed on each subcarrier from the signal received from the RF processing block and the like. The channel decoding block may comprise a demodulator, a deinterleaver, a channel decoder and the like. The transmitter converts a baseband signal into a signal in the cellular band and transmits the signal in the cellular band through an antenna system. For example, the transmitter may include a channel encoding block, a modulation block and an RF processing block. The channel encoding block may include a channel encoder, an interleaver, a modulator and the like. The modulation block may comprise an IFFT operator for placing transmitted data on a plurality of orthogonal subcarriers and the like. In an OFDM system, the modulation block may comprise the IFFT operator. In a CDMA system, the IFFT operator may be replaced with a code spreading modulator and the like. The RF processing block converts a baseband signal received from the modulation block into a signal in the cellular band and outputs the signal in the cellular band through the antenna system.

The mmWave band transceiver 504 includes an antenna system, a receiver, and a transmitter that operate in the mmWave band. The antenna system is used to transmit signals to and receive signals from the air. Herein, the antenna system may form one or more directional beams for communication in the mmWave band as described further above. The receiver converts a signal in the mmWave band received through the antenna system into a baseband signal and demodulates the baseband signal. For example, the receiver may include an RF processing block, a demodulation block, a channel decoding block and the like. The RF processing block converts a signal in the mmWave band received through the antenna system into a baseband signal. The demodulation block may be comprised of an FFT operator for extracting data placed on each subcarrier from the signal received from the RF processing block and the like. The channel decoding block may comprise a demodulator, a deinterleaver, a channel decoder and the like. The transmitter converts a baseband signal into a signal in the mmWave band and transmits the signal in the mmWave band through an antenna system. For example, the transmitter may include a channel encoding block, a modulation block and an RF processing block. The channel encoding block may include a channel encoder, an interleaver, a modulator and the like. The modulation block may comprise an IFFT operator for placing transmitted data on a plurality of orthogonal subcarriers and the like. In an OFDM system, the modulation block may comprise the IFFT operator. In a CDMA system, the IFFT operator may be replaced with a code spreading modulator and the like. The RF processing block converts a baseband signal received from the modulation block into a signal in the mmWave band and outputs the signal in the mmWave band through the antenna system.

The controller 506 controls overall operations of the MS 500. The operations of the MS 500 include any of the operations explicitly or implicitly described above as being performed by a MS. In addition, the controller 506 generates data to be transmitted and process data to be received.

The memory 508 stores programs used by controller 506 for the operations of the MS 500 and various data including any of the information and/or algorithms discussed herein as being received, transmitted, retained or used by a MS.

Figure 6:
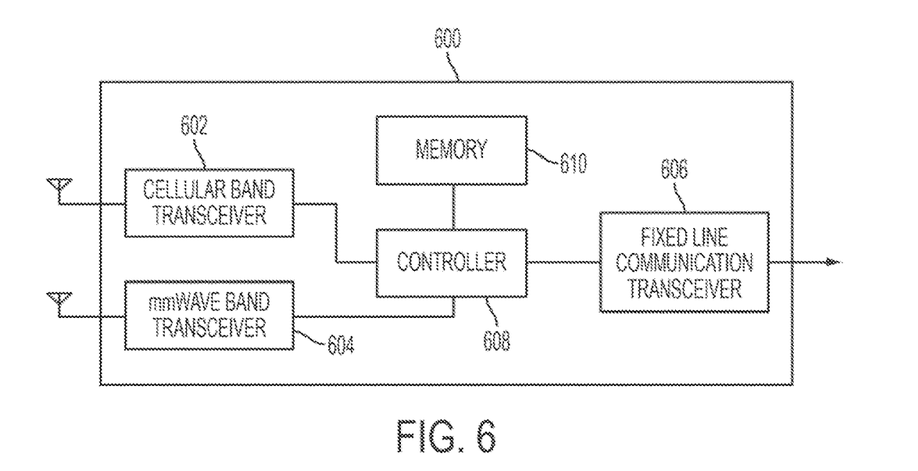
FIG. 6 is a block diagram illustrating an mmWave Access Point (mmAP) in a wireless communication system according to an exemplary embodiment of the present invention.

FIG. 6 is a block diagram illustrating a mmAP in a wireless communication system according to an exemplary embodiment of the present invention.

Referring to FIG. 6, the mmAP 600 includes a cellular band transceiver 602, mmWave band transceiver 604, a fixed line communication transceiver 606, a controller 608, and a memory 610. The mmAP 600 may include any number of additional structural elements. However, a description of additional structural elements of the mmAP 600 is omitted for conciseness. Herein, the mmAP 600 may be an RS or a femto BS.

The cellular band transceiver 602 includes an antenna system, a receiver, and a transmitter that operate in the cellular band. The antenna system is used to transmit signals to and receive signals from the air. The receiver converts a signal in the cellular band received through the antenna system into a baseband signal and demodulates the baseband signal. For example, the receiver may include an RF processing block, a demodulation block, a channel decoding block and the like. The RF processing block converts a signal in the cellular band received through the antenna system into a baseband signal. The demodulation block may be comprised of an FFT operator for extracting data placed on each subcarrier from the signal received from the RF processing block and the like. The channel decoding block may comprise a demodulator, a deinterleaver, a channel decoder and the like. The transmitter converts a baseband signal into a signal in the cellular band and transmits the signal in the cellular band through an antenna system. For example, the transmitter may include a channel encoding block, a modulation block and an RF processing block. The channel encoding block may include a channel encoder, an interleaver, a modulator and the like. The modulation block may comprise an IFFT operator for placing transmitted data on a plurality of orthogonal subcarriers and the like. In an OFDM system, the modulation block may comprise the IFFT operator. In a CDMA system, the IFFT operator may be replaced with a code spreading modulator and the like. The RF processing block converts a baseband signal received from the modulation block into a signal in the cellular band and outputs the signal in the cellular band through the antenna system.

The mmWave band transceiver 604 includes an antenna system, a receiver, and a transmitter that operate in the mmWave band. The antenna system is used to transmit signals to and receive signals from the air. Herein, the antenna system may form one or more directional beams for communication in the mmWave band as described further above. The receiver converts a signal in the mmWave band received through the antenna system into a baseband signal and demodulates the baseband signal. For example, the receiver may include an RF processing block, a demodulation block, a channel decoding block and the like. The RF processing block converts a signal in the mmWave band received through the antenna system into a baseband signal. The demodulation block may be comprised of an FFT operator for extracting data placed on each subcarrier from the signal received from the RF processing block and the like. The channel decoding block may comprise a demodulator, a deinterleaver, a channel decoder and the like. The transmitter converts a baseband signal into a signal in the mmWave band and transmits the signal in the mmWave band through an antenna system. For example, the transmitter may include a channel encoding block, a modulation block and an RF processing block. The channel encoding block may include a channel encoder, an interleaver, a modulator and the like. The modulation block may comprise an IFFT operator for placing transmitted data on a plurality of orthogonal subcarriers and the like. In an OFDM system, the modulation block may comprise the IFFT operator. In a CDMA system, the IFFT operator may be replaced with a code spreading modulator and the like. The RF processing block converts a baseband signal received from the modulation block into a signal in the mmWave band and outputs the signal in the mmWave band through the antenna system.

The fixed line communication transceiver 606 facilities fixed line communication with other network entities within a wireless communication system, such as a BS, and a Packet Data Server/Gateway.

The controller 608 controls overall operations of the mmAP 600. The operations of the mmAP 600 include any of the operations explicitly or implicitly described above as being performed by a mmAP. In addition, the controller 608 generates data to be transmitted and process data to be received.

The memory 610 stores programs used by controller 608 for the operations of the mmAP 600 and various data including any of the information and/or algorithms discussed herein as being received, transmitted, retained or used by a mmAP.

Certain aspects of the present invention may also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A millimeter wave (mmWave) Access Point (mmAP) for use in a mobile communication system that includes a plurality of Base Stations (BSs) capable of communicating with a plurality of Mobile Stations (MSs), the mmAP comprising:
    a mmWave band transceiver configured to communicate in the mmWave band, the mmWave band transceiver comprising an antenna array, a receiver, and a transmitter that operate in the mmWave band;
    a controller configured to control the mmWave band transceiver to communicate with an MS; and
    a cellular band transceiver configured to communicate in a cellular band, wherein, when performing communication with the MS via the mmWave band, the controller further is configured to control the cellular band transceiver to communicate with a BS, and wherein the controller further relays signals from the BS to the MS and from the MS to the BS, wherein at least one control channel is communicated in the cellular band and at least one data packet is communicated in the mmWave band, wherein the mmWave band transceiver is configured to use beamforming to communicate the at least one data packet, wherein the at least one control channel includes a packet data control channel, and wherein the mmAP is one of: a Relay Station (RS) or a femto BS.

2. A Base Station (BS) for use in a mobile communication system that includes a plurality of BSs capable of communicating with a plurality of Mobile Stations (MSs), the BS comprising:

a cellular band transceiver configured to communicate with an MS in a cellular band, the cellular band transceiver comprising an antenna system, a receiver, and a transmitter which operate in the cellular band;

a millimeter wave (mmWave) band transceiver configured to communicate with at least one other BS in the mmWave band, the mmWave band transceiver comprising an antenna system array, a receiver, and a transmitter which operate in the mmWave band; and a controller configured to control both the cellular band transceiver and the mmWave band transceiver, wherein the controller controls the mmWave band transceiver to communicate at least one data packet through a first beamforming in the mmWave band in a first time slot with a first BS and controls the mmWave band transceiver to communicate at least one data packet through a second beamforming in the mmWave band in a second time slot with a second BS.

3. The BS of claim 2, wherein communication in each of the in a first time slot and the first time slot is bidirectional.

4. The BS of claim 2, wherein the communication in a first time slot is a communication from the BS to first BS and the communication in the second time slot is a communication from the BS to second BS, and further wherein a communication in the mmWave band from the first BS to the BS is performed in a third time slot, and a communication in the mmWave band from the second BS to the BS is performed in a fourth time slot.

5. A Base Station (BS) for use in a mobile communication system that includes a plurality of BSs capable of communicating with a plurality of Mobile Stations (MSs), the BS comprising:

a cellular band transceiver configured to communicate with an MS in a cellular band, the cellular band transceiver comprising an antenna system, a receiver, and a transmitter that operate in the cellular band;

a millimeter wave (mmWave) band transceiver configured to communicate with at least one other BS in the mmWave band, the mmWave band transceiver comprising an antenna array, a receiver, and a transmitter that operate in the mmWave band; and a controller configured to:

control both the cellular band transceiver and the mmWave band transceiver, and detect network congestion between the BS and a Packet Data Server/Gateway, wherein, when the controller detects network congestion, the controller controls the mmWave band transceiver to communicate at least one data packet through beamforming in the mmWave band with another BS that would result in less congestion between the BS and the Packet Data Server/Gateway.

* * * * *